(12) United States Patent
Senba et al.

(10) Patent No.: US 7,349,625 B2
(45) Date of Patent: Mar. 25, 2008

(54) INTERMEDIATE ADAPTER

(75) Inventors: Takehiko Senba, Asaka (JP); Mikio Watanabe, Asaka (JP); Hiroshi Tanaka, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 335 days.

(21) Appl. No.: 11/174,585

(22) Filed: Jul. 6, 2005

(65) Prior Publication Data
US 2006/0013575 A1   Jan. 19, 2006

(30) Foreign Application Priority Data
Jul. 16, 2004   (JP) .............................. 2004-210237

(51) Int. Cl.
*G03B 17/00* (2006.01)
(52) U.S. Cl. ........................................................ 396/55
(58) Field of Classification Search .................. 396/52, 396/53, 55; 348/208.4, 208.7, 208.8, 208.22, 348/208.11; 359/811, 814, 819, 827–830
See application file for complete search history.

(56) References Cited
U.S. PATENT DOCUMENTS 4,780,739 A * 10/1988 Kawakami et al. ........... 396/54
5,880,783 A * 3/1999 Ma .............................. 348/373
6,052,509 A * 4/2000 Abe ............................. 386/117
6,101,339 A * 8/2000 Miki et al. ................... 396/301
6,263,162 B1 * 7/2001 Yamazaki et al. ............ 396/55
6,526,231 B2 * 2/2003 Sato et al. .................... 396/55
6,611,662 B1 * 8/2003 Grober ......................... 396/55
6,757,011 B1 * 6/2004 Takeda et al. ........... 348/208.7

FOREIGN PATENT DOCUMENTS

| JP | 6-189181 A | 7/1994 |
| JP | 6-250098 A | 9/1994 |
| JP | 10-104679 A | 4/1998 |
| JP | 2000-352732 A | 12/2000 |

* cited by examiner

*Primary Examiner*—Kimberly D. Nguyen
*Assistant Examiner*—Andrew Williams
(74) *Attorney, Agent, or Firm*—Sughrue Mion, PLLC

(57) ABSTRACT

There is provided an intermediate adapter having a camera shake correction function, in which an exchange head provided with an image taking optical system and an imaging device is applicable to a camera system, and a camera system having the intermediate adapter. The exchange head is mounted on the intermediate adapter having a head driving section, and the exchange head mounted on the intermediate adapter is mounted on a camera main frame. The head driving section drives the exchange head in accordance with a detection signal detected by a camera shake detection section of the intermediate adapter.

18 Claims, 14 Drawing Sheets

INTERMEDIATE ADAPTER

BACKGROUND OF THE INVENTION

1. Field of the Invention

The present invention relates to an intermediate adapter that is interposed between an exchange head for generating an image signal through catching a subject image by an image taking optical system and a camera main frame on which the exchange head is detachably mounted to receive the image signal and perform at least one of an image display and an image storage. The intermediate adapter is adapted to receive the image signal from the exchange head and transfer the image signal to the camera main frame when the exchange head is attached to the camera main frame.

2. Description of the Related Art

It happens that when a person takes a photograph by a camera, too hard release operation of the camera would bring about a camera shake. The camera shake phenomenon often occurs when a beginner performs a release operation of a camera, or an operator not restricted to the beginner performs the release operation instantly in response to the shutter chance. In view of the foregoing, there is proposed a camera having a function of correcting the camera shake so as to perform fine photography even if the beginner is concerned, or even if the release operation is performed instantly in response to the shutter chance. As the camera shake correcting function, in many cases, there are known ones in which lens or reflection mirrors, which are a part of the image taking optical system, are driven in accordance with a detection condition of a camera shake detecting section (cf. Japanese Patent Application Laid Open Gazette TokuKai Hei. 10-104679, and Japanese Patent Application Laid Open Gazette TokuKai Hei. 6-250098). Further there is proposed one in which a vibration proofing adapter is mounted on the camera main frame to alarm the camera shake (cf. Japanese Patent Application Laid Open Gazette TokuKai 2000-352732). Furthermore, in a camera system comprising an exchange head and a camera main body, there is proposed one in which an intermediate adapter is interposed between the exchange head and the camera main body so as to cause the intermediate adapter to correct the camera shake (cf. Japanese Patent Application Laid Open Gazette TokuKai Hei. 6-189181).

Japanese Patent Application Laid Open Gazette TokuKai Hei. 6-189181 discloses technology in which variable vertex angle prism (hereinafter it is referred to as VAP) is disposed in an intermediate adapter and convexoconcave lenses are provided before and after the VAP, and the VAP in the intermediate adapter is driven in accordance with the detection result of the camera shake detection sensor so that the camera shake correction is carried out with great accuracy. This type of structure, that is, one in which the VAP and the convexoconcave lenses are provided in the intermediate adapter and the VAP is driven so that an image free from the camera shake is formed on an imaging device, is effective for a separate type of camera in which an image taking optical system is disposed at the exchange head side and the imaging device is disposed at the camera main frame side. But such a type of structure is not applicable to a camera system wherein an exchange head, which is provided with an image taking optical system and an imaging device in a united body, is mounted on a camera main frame.

SUMMARY OF THE INVENTION

In view of the foregoing, it is an object of the present invention to provide an intermediate adapter having a camera shake correction function, in which an exchange head provided with an image taking optical system and an imaging device is applicable to a camera system, and a camera system having the intermediate adapter.

To achieve the above-mentioned objects, the present invention provides an intermediate adapter that is interposed between an exchange head for generating an image signal through catching a subject image by an image taking optical system and a camera main frame on which the exchange head is detachably mounted to receive the image signal and perform at least one of an image display and an image storage, the intermediate adapter being attachable to the camera main frame, and the exchange head being attachable to the intermediate adapter, the intermediate adapter comprising:

a camera shake detection section that detects camera shake; and a head driving section that drives the exchange head in a direction that the camera shake is corrected in accordance with a detection result of the camera shake detection section.

According to the intermediate adapter, the exchange head has an imaging device and an image taking optical system for forming a subject image on the imaging device. The use of the intermediate adapter makes it possible to correct the camera shake through driving the exchange head in one united body.

In this manner, when the exchange head, which has the imaging device and the image taking optical system, is mounted on the intermediate adapter, and is then mounted on the camera main frame, even if the camera main frame is shaken by the camera main frame, the adoption of the intermediate adapter interposed between the camera main frame and the exchange head makes it possible to the exchange head in one united body in a direction opposite to a shake direction of the camera main frame so that the optical axis coupling the image taking optical system of the exchange head with the imaging device does not move in one united body.

In the intermediate adapter according to the present invention as mentioned above, it is acceptable that the exchange head or the camera main frame has a sensor that detects the camera shake instead of the camera shake detection section, and the intermediate adapter comprises a camera shake receiving section that receives a camera shake detection signal.

According to this feature, even if the exchange head has the camera shake detecting section, or even if the camera main frame has the camera shake detecting section, the camera shake receiving section receives a camera shake detection result from the camera shake detection section, so that the head driving section corrects the camera shake in accordance with the camera shake detection result.

In the intermediate adapter according to the present invention as mentioned above, it is preferable that the exchange head has correction permission/prohibition information indicative of permission or prohibition of camera shake correction, the intermediate adapter has a correction permission/prohibition receiving section that receiving the correction permission/prohibition information from the exchange head that is mounted on the intermediate adapter, and the head driving section drives the exchange head only when the correction permission/prohibition information received by the correction permission/prohibition receiving section is indicative of a correction permission.

There are various types of the exchange heads, for example, in weight and size of the exchange heads too. With respect to the size of the exchange heads, it is clear for an operator whether the exchange head can be mounted on the camera main frame, but with respect to the weight of the exchange heads, it is unclear for an operator whether the exchange head can be suitably mounted on the camera main frame. Further, in some lens specification, it is presumed that a driving amount of the head driving section is greatly different.

For this reason, according to the present invention, there is stored in the exchange head correction permission/prohibition information indicative of whether the camera shake correction in the intermediate adapter is permissible or not, and when the exchange head is mounted on the intermediate adapter, the exchange head transmits the correction permission/prohibition information to the correction permission/prohibition receiving section to decide whether the head driving section drives the exchange head.

In other words, in the even that an exchange head, of which weight exceeds a camera shake correction range at the intermediate adapter, is mounted on the intermediate adapter, or in the event that an exchange head, which needs a driving of a range exceeding a driving amount for the head driving section in accordance with a lens specification, is mounted on the intermediate adapter, when the exchange head is mounted on the intermediate adapter, the correction permission/prohibition receiving section receives the correction permission/prohibition information transmitted from the exchange head, so as to prohibit the head driving section from performing the camera shake. correction in accordance with the prohibition information of the correction permission/prohibition information.

In the intermediate adapter according to the present invention as mentioned above, it is preferable that the exchange head has categorization information indicative of categorization of the exchange head, the intermediate adapter comprises a categorization information receiving section that receives the categorization information from the exchange head that is mounted on the intermediate adapter, and an association storage section that stores an association between the categorization information and the correction permission/prohibition information indicative of permission or prohibition of camera shake correction, and the head driving section drives the exchange head only when the categorization information received by the categorization information receiving section is associated with a correction permission in the association between the categorization information and the correction permission/prohibition information.

According to the intermediate adapter, the categorization information receiving section receives the received information, and decides whether the head driving section carries out the correction considering the association with the information stored in the association storage section.

In intermediate adapter according to the present invention as mentioned above, it is preferable that the exchange head is held via a holding adapter for holding the exchange head on the intermediate adapter in accordance with categorization of the exchange head.

When the exchange head is mounted on the intermediate adapter, it happens that the exchange head cannot be mounted on the intermediate adapter, because a size of the exchange head does not meet.

In view of the foregoing, there are provided several sorts of holding adapters in compliance with sizes of the exchange heads, so that there will be increased the number of the sorts of the exchange heads capable of being mounted on the intermediate adapter. The manufacturing cost of the holding adapters is relatively inexpensive.

In the intermediate adapter according to the present invention as mentioned above, it is preferable that the intermediate adapter has a palm guard section provided on at least lower portion of the exchange head, and being at least to cover a rear portion of the exchange head mounted on the intermediate adapter.

In intermediate adapter according to the present invention as mentioned above, it is preferable that the palm guard section has a geometry to cover the rear portion of the exchange head in its entirety or an under portion of the rear portion.

Even if the head driving section of the intermediate adapter drives the exchange head to perform the correction of the camera shake, it is difficult to drive the exchange head when an operator holds the exchange head.

In view of the foregoing, according to the present invention, the palm guard section has a geometry to cover the rear portion of the exchange head in its entirety or an under portion of the rear portion.

This feature makes it possible to surely drive the exchange head in a direction that the intermediate adapter corrects the camera shake.

To achieve the above-mentioned objects, the present invention provides a camera system comprising an exchange head for generating an image signal through catching a subject image by an image taking optical system, a camera main frame on which the exchange head is detachably mounted to receive the image signal and perform at least one of an image display and an image storage, and an intermediate adapter that is interposed between the exchange head and the camera main frame, the intermediate adapter being attachable to the camera main frame, and the exchange head being attachable to the intermediate adapter, the intermediate adapter comprising:

a camera shake detection section that detects camera shake; and a head driving section that drives the exchange head in a direction that the camera shake is corrected in accordance with a detection result of the camera shake detection section.

According to the camera system of the present invention as mentioned above, it is possible to implement a camera system provided with an intermediate adapter having a camera shake correction function.

In the camera system according to the present invention as mentioned above, it is acceptable that the exchange head or the camera main frame has a sensor that detects the camera shake instead of the camera shake detection section, and the intermediate adapter comprises a camera shake receiving section that receives a camera shake detection signal.

In the camera system according to the present invention as mentioned above, it is acceptable that the exchange head has correction permission/prohibition information indicative of permission or prohibition of camera shake correction, the intermediate adapter has a correction permission/prohibition receiving section that receiving the correction permission/prohibition information from the exchange head that is mounted on the intermediate adapter, and the head driving section drives the exchange head only when the correction permission/prohibition information received by the correction permission/prohibition receiving section is indicative of a correction permission.

In the camera system according to the present invention as mentioned above, it is acceptable that the exchange head has categorization information indicative of categorization of the exchange head, the intermediate adapter comprises a categorization information receiving section that receives the categorization information from the exchange head that is mounted on the intermediate adapter, and an association storage section that stores an association between the categorization information and the correction permission/prohibition information indicative of permission or prohibition of camera shake correction, and the head driving section drives the exchange head only when the categorization information received by the categorization information receiving section is associated with a correction permission in the association between the categorization information and the correction permission/prohibition information.

In the camera system according to the present invention as mentioned above, it is preferable that the camera system further comprises a holding adapter for holding the exchange head on the intermediate adapter in accordance with categorization of the exchange head, and wherein the exchange head is held via the holding adapter.

In the camera system according to the present invention as mentioned above, it is preferable that the intermediate adapter has a palm guard section provided on at least lower portion of the exchange head, and being at least to cover a rear portion of the exchange head mounted on the intermediate adapter.

In the camera system according to the present invention as mentioned above, it is preferable that the palm guard section has a geometry to cover the rear portion of the exchange head in its entirety or an under portion of the rear portion.

DETAILED DESCRIPTION OF PREFERRED EMBODIMENTS

Embodiments of the present invention will be described with reference to the accompanying drawings.

Figure 1:
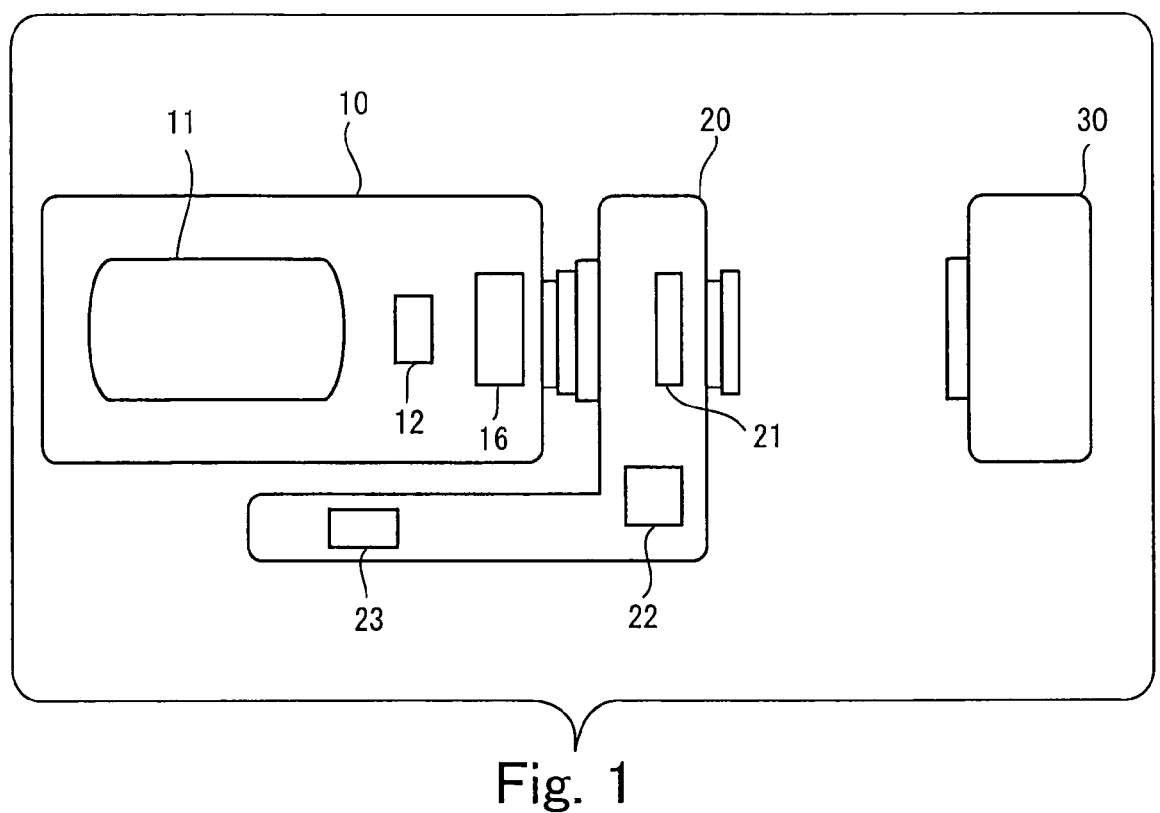
FIG. 1 is a view of an intermediate adapter according to an embodiment of the present invention.

FIG. 1 is a view of an intermediate adapter according to an embodiment of the present invention, and a camera system having the intermediate adapter.

FIG. 1 shows a state in which an exchange head 10 is mounted on an intermediate adapter 20 on an oscillating basis, and it is intended that the intermediate adapter 20 is mounted on a camera main frame 30. When the intermediate adapter 20, onto which the exchange head 10 is mounted, is mounted on the camera main frame 30, it implements an embodiment of the camera system referred to in the present invention.

The intermediate adapter 20 is interposed between the camera head 10 and the camera main frame 30, and has functions of receiving an image signal from the exchange head 10 and transferring the image signal to the camera main frame 30. The intermediate adapter 20 has further function of driving the exchange head 10 in a direction of correcting a camera shake of the camera main frame 30 in response to the camera shake. In other words, the intermediate adapter 20 serves as a camera shake-correcting unit. In the event that an operator of photography does not intend to correct the camera shake, it is effective that the exchange head 10 is directly mounted on the camera main frame 30 without using the intermediate adapter 20.

The intermediate adapter 20 shown in FIG. 1 comprises a CPU 21, a camera shake detecting section 22 and a head driving section 23. The exchange head 10 comprises an imaging device 12 (hereinafter it is referred to as CCD since CCD imaging device is used), an image taking lens 11 for forming an image on the CCD 12, and a CPU 16 for controlling the CCD 12. When the exchange head 10 is mounted on the intermediate adapter 20 and then mounted on the camera main frame 30, an image signal, which is generated in the CCD 12 of the exchange head 10, is outputted to the intermediate adapter 20 in accordance with control of the CPU 16 of the exchange head 10, and the thus generated image signal is outputted via the intermediate adapter 20 to the camera main frame 30. The camera main frame 30 receives the thus outputted image signal to perform processing for an image display in accordance with the image signal and processing for an image recording.

Incidentally, according to the present embodiment, the camera shake detecting section 22 is provided in the intermediate adapter 20. It is acceptable the camera shake detecting section 22 is provided in the camera main frame 30 or in the exchange head 10. In such a case, it is effective that the camera main frame or the exchange head is provided with a transmission section for transmitting the detection result of the camera shake of the camera shake detecting section to the intermediate adapter 20. And in the event that the intermediate adapter is provided with the receiving section for receiving the detection result from the transmission section, it is possible to perform correction of the camera shake in a similar fashion to that of a case where the intermediate adapter is provided with has the camera shake detecting section.

Figure 2:
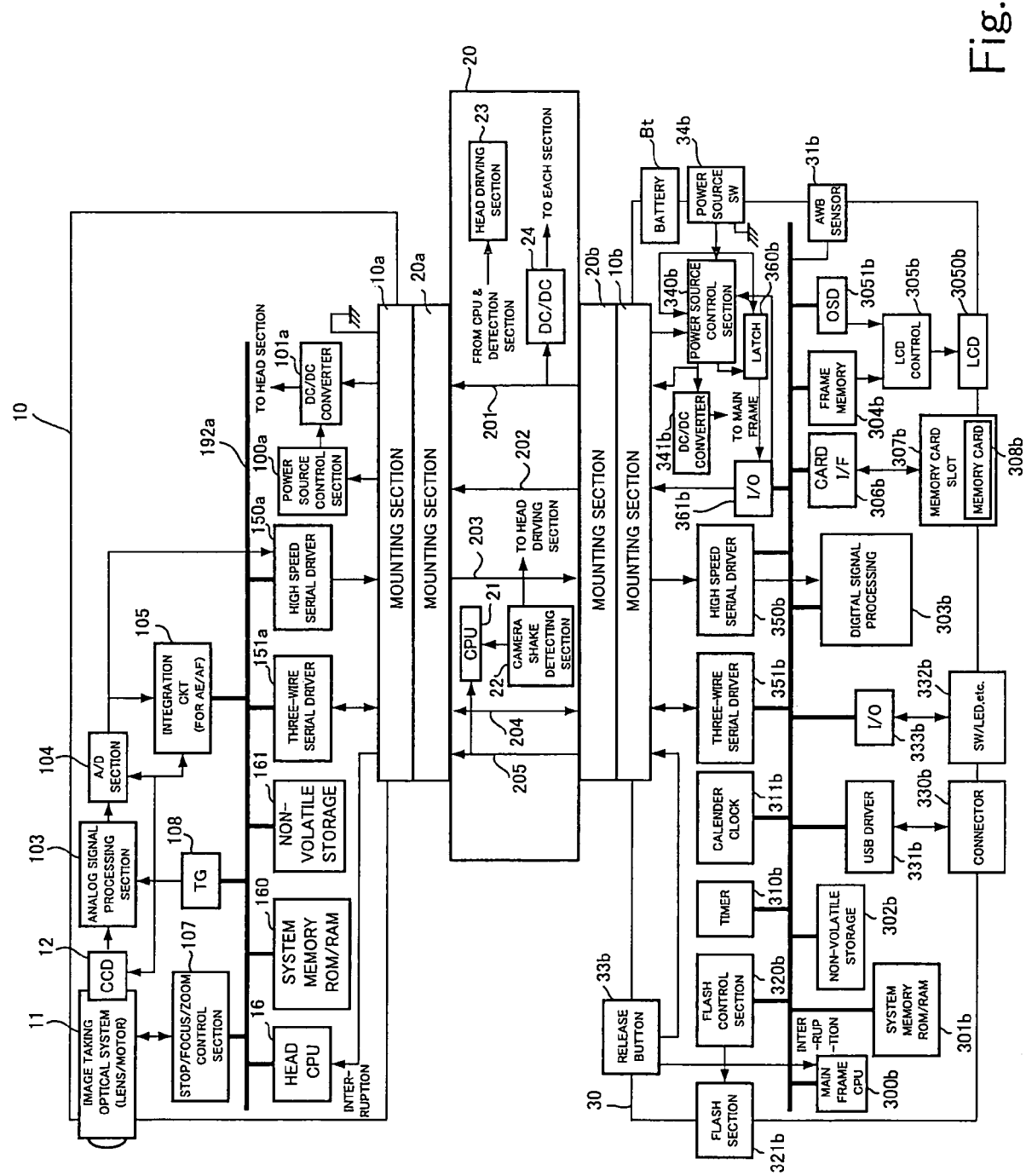
FIG. 2 is a block diagram of structures of a camera head in which an exchange head 10 shown in FIG. 1 is mounted on an intermediate adapter of the present invention, and the intermediate adapter is mounted on a camera main frame 30, the intermediate adapter, and the camera main frame 30.

FIG. 2 is a block diagram of structures of a camera head in which the exchange head 10 shown in FIG. 1 is mounted on an intermediate adapter of the present invention, and the intermediate adapter is mounted on a camera main frame 30, the intermediate adapter, and the camera main frame 30.

In FIG. 2, the upper stage, the middle stage and the lower stage show the internal structure of the exchange head 10, the internal structure of the intermediate adapter 20 and the internal structure of the camera main frame 30, respectively.

As mentioned above, the intermediate adapter 20 is used as the camera shake-correcting unit, and thus in the event that no camera shake correction is carried out, there is no need that the intermediate adapter 20 is mounted.

Thus, in the intermediate adapter 20, there are provided a mounting section 20a of the exchange head 10 side that is the same as the mounting section 10b of the camera main frame, and a mounting section 20b of the camera main frame side that is the same as the mounting section 10a of the exchange head 10.

In the intermediate adapter 20, several through lines 201 to 205 are provided on a substrate such as flexible substrate. Thus, when the intermediate adapter 20 is interposed between the exchange head 10 and the camera main frame 30, the several through lines 201 to 205 serve as a medium for transmission of an image signal from the exchange head 10 to the camera main frame 30, and in a case where control signals are transmitted between the exchange head 10 and the camera main frame 30, the through lines 201 to 205 serve as a medium for transmission of the control signals.

Next, there will be briefly explained a flow of the image signal.

First, in an image taking optical system 11, the subject is image-formed on the CCD 12. When the CCD 12 receives from a timing generator (hereinafter it is referred to as TG) 108 a signal indicative of exposure over, the CCD 12 outputs an image signal in synchronism with a timing of the supply of the signal indicative of exposure over. When the image signal outputted from the CCD 12 is supplied to an analog signal processing section 103 to reduce noises and/or regulate an amplitude of the signal, an A/D section 104 converts an analog signal regulated in the amplitude into a digital signal and supplies the digital signal to a high speed serial driver 150a. The digital image signal is supplied to the intermediate adapter 20 via a serial bus driven by the high speed serial driver 150a.

When the intermediate adapter 20 receives an image signal, the image signal is fed to the camera main frame 30 side via the through line 203 constituting the serial bus. A high speed serial driver 350b, which is provided at the camera main frame 30 side, receives the image signal supplied to the camera main frame 30 side, and supplies the received image signal to a digital signal processing section 303b. Further, a signal, which is processed in the digital signal processing section 303b, is supplied to a frame memory 304b. When the frame memory 304b stores the image signal, an LCD control section 305b causes an image according to the image signal stored in the frame memory 304b to be displayed on a display screen of an LCD 3050b.

When a release button 33b of the camera main frame 30 side is depressed, a release signal is generated in form of an interruption signal and is supplied via the through line 205 of the intermediate adapter 20 to a head CPU 16 of the exchange head 10. When the interruption signal passes through the intermediate adapter 20, the interruption signal is supplied also to the CPU 21 so that the CPU 21 decides whether the shake detected by the camera shake detecting section 22 is the camera shake. For example, when the CPU 21 detects that a detection terminal of the camera shake detecting section 22 changes from L to H in timing that the release signal is supplied, the CPU 21 decides it as the camera shake, and supplies to the head driving section 23 a detection signal indicative of the detection state detected by the camera shake detecting section 22, so that the CPU 21 causes the head driving section 23 to drive the exchange head 10 in a direction that the camera shake is corrected.

In this manner, when photography is carried out while the exchange head 10 is driven in a direction that the camera shake is corrected, a signal representative of a still picture created in the CCD 12 is fed via the intermediate adapter 20 to the camera main frame 30 so that a signal processing section 303b of the camera main frame 30 performs the signal processing, and thereafter a card I/F 306b records the image signal subjected to the signal processing on a memory card 308b that is mounted on a memory card slot 307b.

Incidentally, FIG. 2 further shows: memories (for example, a system memories 160 and 301b) necessary for causing central operating processing apparatuses such as a main frame CPU 300 and the head CPU 16 to operate in accordance with the processing procedure; a switch 332b for supplying an input signal to the central operating processing apparatuses; a USB driver 331b; an LED 332b that turns on in accordance with an output signal from the central operating processing apparatuses; and a flash light control section 320b that emits a flash light in compliance with tint detected by the AWB sensor 31b in timing that the output signal is supplied from the central operating processing apparatuses at the time of photography. FIG. 2 still further shows: DC/DC converters 101a and 341b for supplying electric power from a battery Bt to the associated sections of the camera main frame 30 and the associated sections of the exchange head 10; power source control sections 100a and 340a for controlling the DC/DC converters 101a and 341b, respectively; and a DC/DC converter 24 for supplying electric power to the associated sections of the intermediate adapter 20.

Here, there will be explained structures of the exchange head 10, the intermediate adapter 20, and the intermediate adapter 20 in a state that the exchange head 10 is mounted on the intermediate adapter 20.

Figure 3:
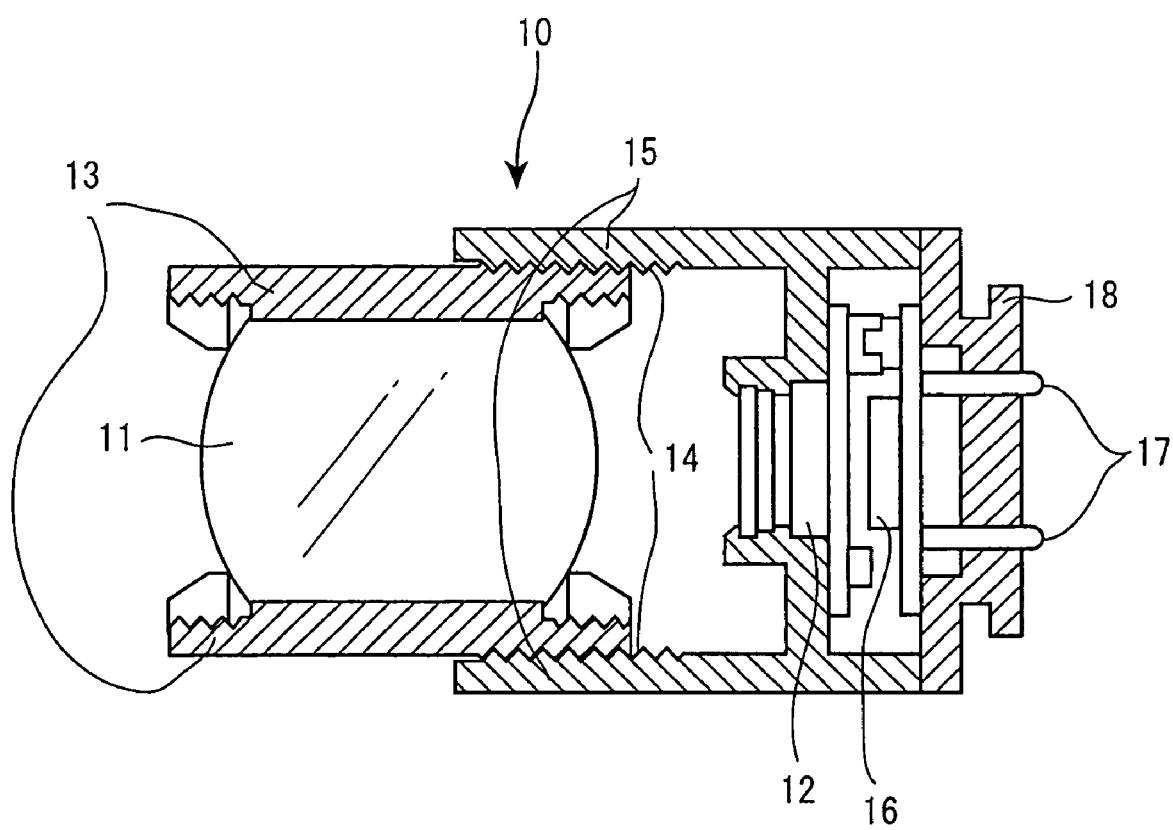
FIG. 3 is a view showing an example of the exchange head 10.
Figure 4:
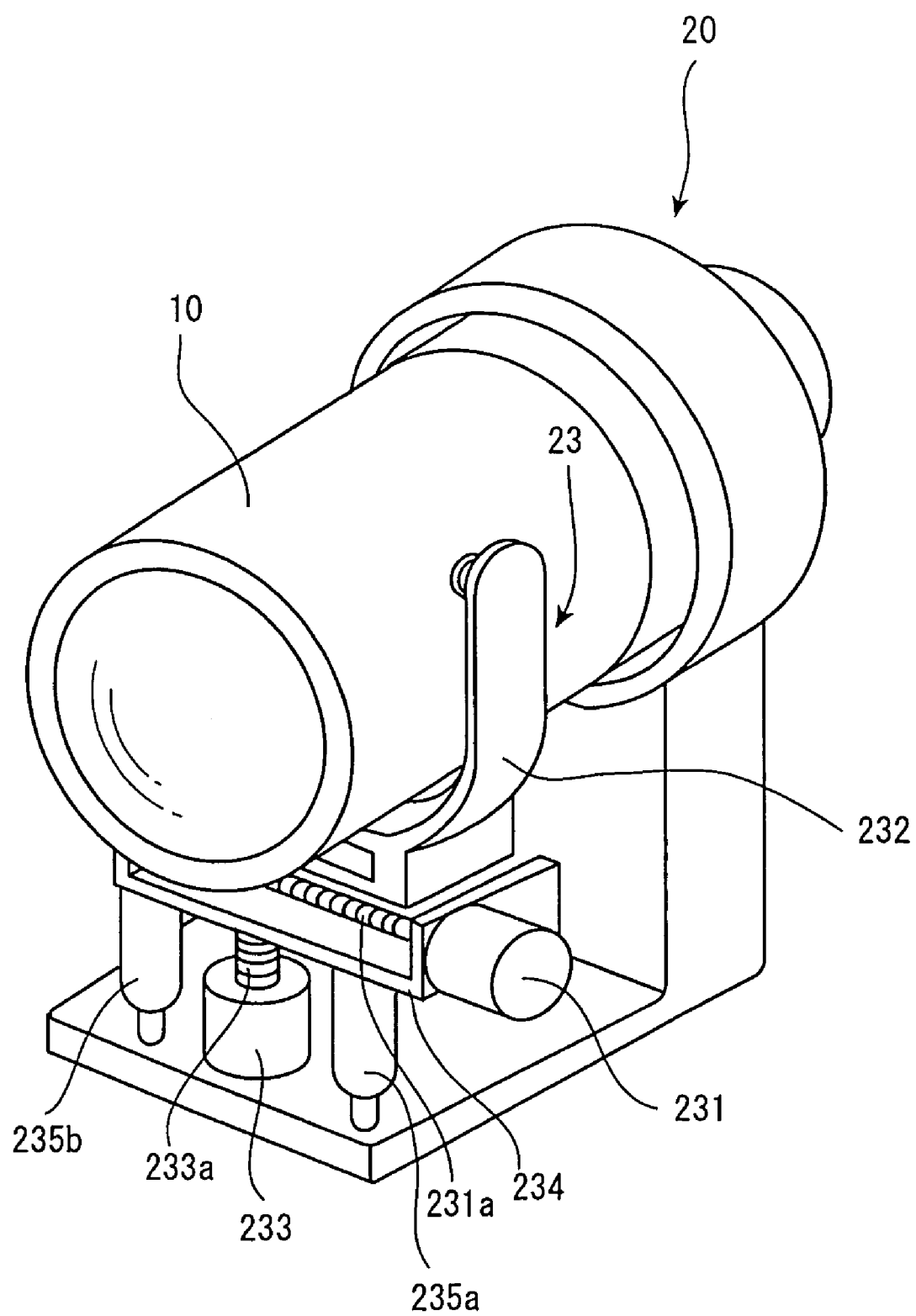
FIG. 4 is a perspective view of the intermediate adapter 20 mounted on the exchange head 10 shown in FIG. 2, looking obliquely from upper.
Figure 5:
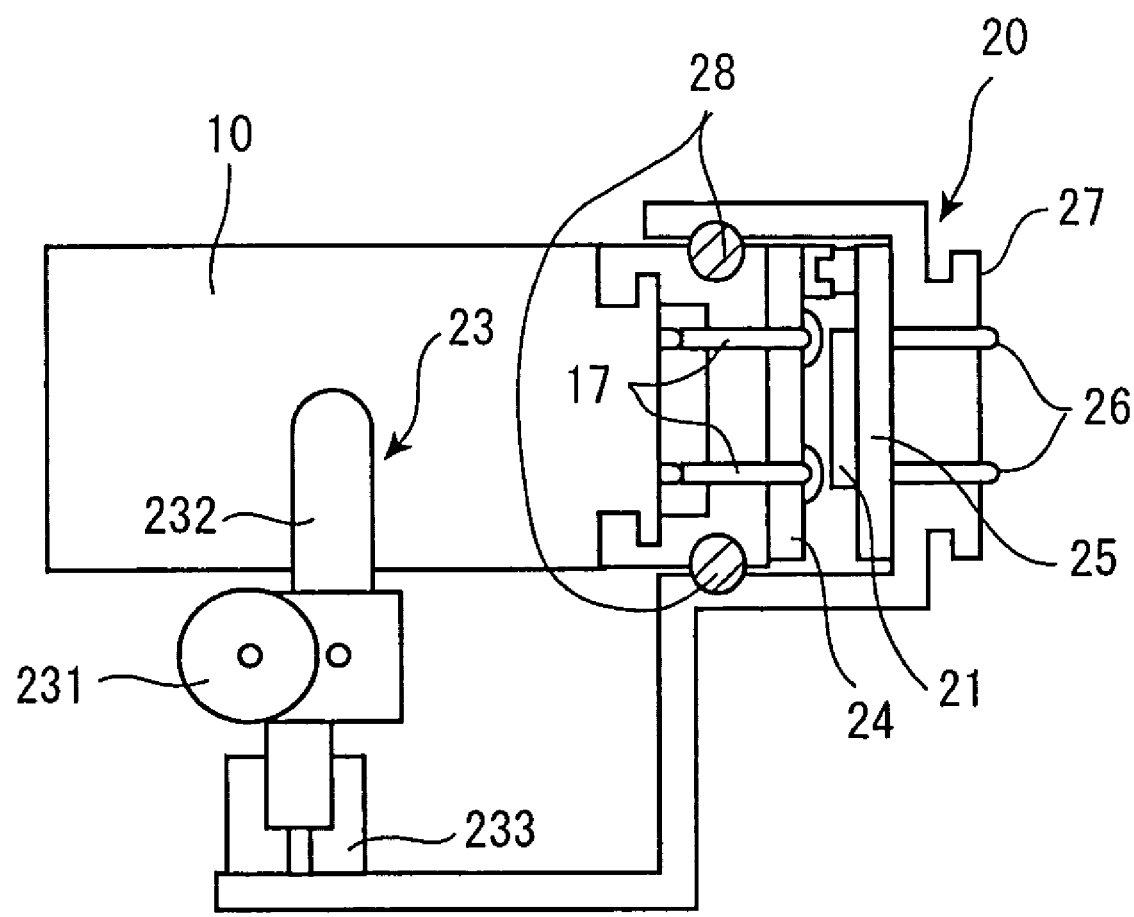
FIG. 5 is a cross-sectional view in which the center of the intermediate adapter 20 is sectioned taking along the optical axis.
Figure 6:
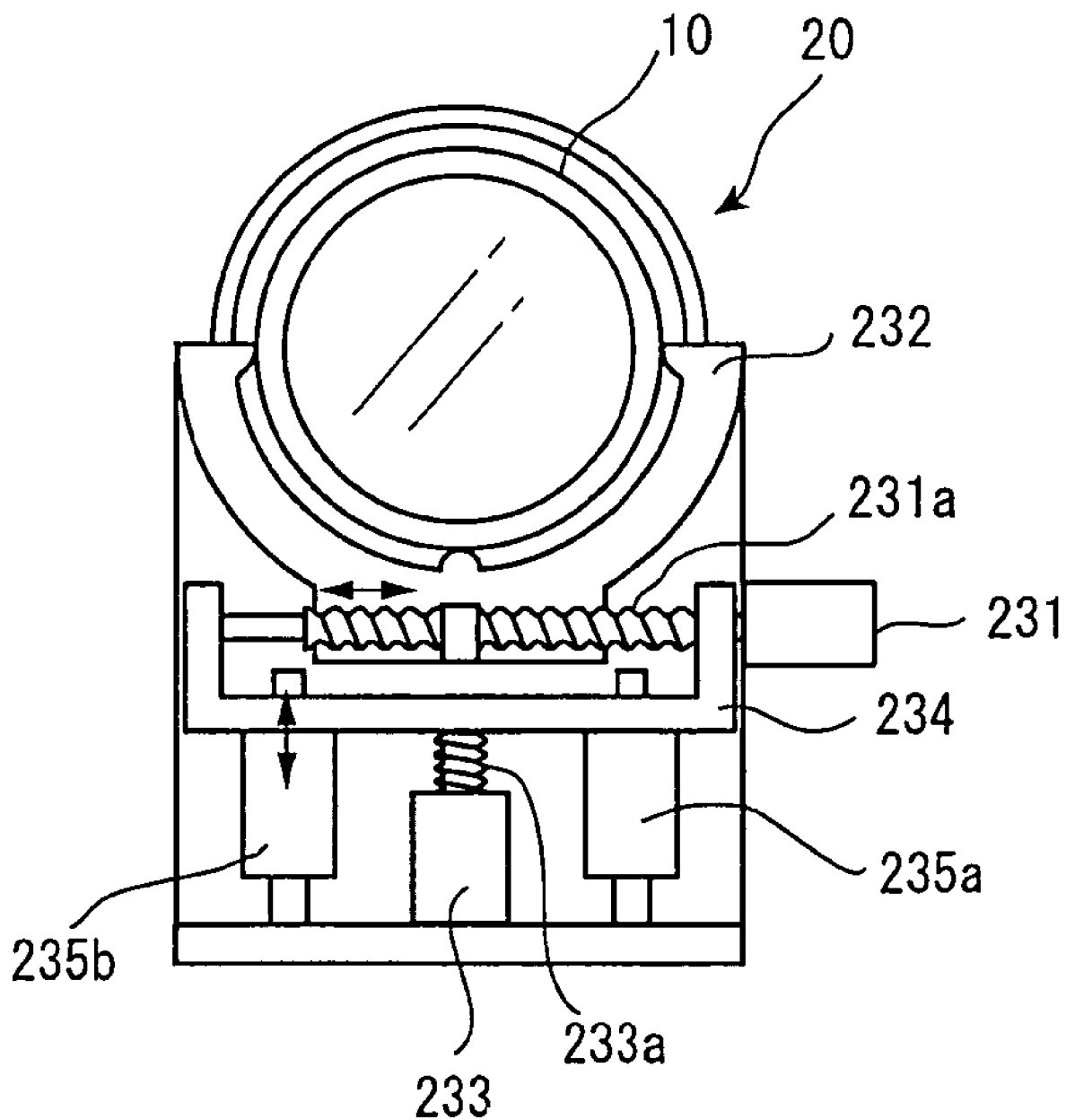
FIG. 6 is a front view of the intermediate adapter 20 onto which the exchange head 10 is mounted.

FIG. 3 is a view showing an example of the exchange head 10. FIG. 4 is a perspective view of the intermediate adapter 20 mounted on the exchange head 10 shown in FIG. 2, looking obliquely from upper. FIG. 5 is a cross-sectional view in which the center of the intermediate adapter 20 is sectioned taking along the optical axis. FIG. 6 is a front view of the intermediate adapter 20 onto which the exchange head 10 is mounted.

In the exchange head 10 shown in FIG. 3, an internal barrel 13, which holds the image taking lens 11, is movably supported via a precision screw 14 on a lens barrel 15. A CCD 12 is held on the lens barrel 15. A subject, which is focused to the CCD 12, is formed by the image taking lens 11 that is held by the internal barrel 13 and is movable in the optical axis direction. At the rear end portion of the lens barrel 15, there is disposed a CPU 16 for performing a control for causing the CCD 12 to generate an image signal through exposure. The image signal, which is generated in the CCD 12 in accordance with the control of the CPU 16, is outputted from a connecting terminal 17 disposed at the rear side of the exchange head 10.

When the exchange head 10 is mounted on the camera main frame 30 directly without being mounted on the intermediate adapter 20, the image signal, which is transmitted via the connecting terminal 17, is fed to the camera main frame 30. When the exchange head 10 is mounted on the intermediate adapter 20, the image signal is fed via the intermediate adapter 20 to the camera main frame 30.

As shown in FIG. 4 to FIG. 6, the intermediate adapter 20 has, at one side thereof wherein the exchange head 10 is mounted, an accepting section 24 for accepting the connecting terminal 17 of the exchange head 10 as explained in FIG. 2 in a similar fashion to that of the camera main frame 30. And at another side of the intermediate adapter 20 wherein it is mounted on the camera main frame 30, the intermediate adapter 20 has a mounting section 27 and a connecting terminal 26 to be accepted to the camera main frame 30 in a similar fashion to that of a mounting section 18 of the rear end side of the exchange head 10. In other words, the exchange head 10 can be mounted on the camera main frame 30 regardless of a matter that the exchange head 10 is mounted on the intermediate adapter 20 or not. According to the intermediate adapter 20 of the present invention, since there is a need that the head driving section 23 of the intermediate adapter 20 shown in FIG. 1 can drive the exchange head 10 in its entirety, an elastic member 28 is interposed between the outer periphery of the exchange head 10 wherein the exchange head 10 is mounted on the intermediate adapter 20 and the inner periphery of the intermediate adapter 20 so that the exchange head 10 is held elastically. The feature that the exchange head 10 is held elastically makes it possible, when the camera main frame 30 swivels in a rotary direction by the camera shake, to swivel the exchange head 10 in its entirety in the opposite rotary direction to the rotary direction.

Here, there will be explained how a correction is made for the camera shake when the exchange head 10 is mounted on the intermediate adapter 20 and is mounted on the camera main frame 30 in conjunction with FIG. 4 to FIG. 6.

The intermediate adapter 20 shown in FIG. 4 to FIG. 6 is provided with a head driving section 23 for driving the exchange head 10 in a horizontal direction (an X-axis) and also in a vertical direction (a Y-axis). Hereinafter, a portion of the head driving section 23, which drives the exchange head 10 in the horizontal direction, is denoted as an X-axis driving section, and a portion of the head driving section 23, which drives the exchange head 10 in the vertical direction, is denoted as a Y-axis driving section.

Thus, a provision of the X-axis driving section and the Y-axis driving section makes it possible to drive the exchange head 10 in both the horizontal direction and the vertical direction timely. This feature makes it possible to drive the exchange head 10 in a direction to correct a camera shake, even if the camera main frame 30 swivels by the camera shake in any directions including the X-axis and the Y-axis.

According to the intermediate adapter 20 of the present embodiment, there is provided such an arrangement that to drive the exchange head 10 the camera shake detecting section 22 of the intermediate adapter 20 is provided with a horizontal detection section for detecting the camera shake in the horizontal direction and a vertical detection section for detecting the camera shake in the vertical direction, and a detection signal detected in the horizontal detection section is directly fed to the X-axis driving section and a detection signal detected in the vertical detection section is directly fed to the Y-axis driving section, so that the head driving section responses promptly in accordance with a detection result of the camera shake detecting section.

FIG. 4 to FIG. 6 discloses, as the X-axis driving section, an arrangement in which an engagement section, which is engaged with a lead screw 231a on a spiral basis, is provided on an X-carriage 232 on which the exchange head 10 is placed, and a lead screw 231a is rotated by a motor 231 so that the X-carriage 232 moves in either one direction of the left and right in accordance with the detection signal detected by the horizontal detection section. In a similar fashion, FIG. 4 to FIG. 6 discloses, as the Y-axis driving section, an arrangement in which the X-carriage 232 and the lead screw 231a are placed on a Y-carriage 234 and a lower edge portion of the Y-carriage 234 is pushed up and pushed down by a lead screw 233a in accordance with the detection signal detected by the vertical detection section. Incidentally, to push up and push down the Y-carriage 234 by the lead screw 233a, for the purpose of a stabilization of a posture of the Y-carriage 234, there are provided guides 235a and 235b on both edge portions of the Y-carriage 234, respectively.

In this manner, the head driving section 23 is provided with the X-axis driving section and the Y-axis driving section for driving the exchange head 10 in accordance with the detection results of the camera shake detection section in the X-axis and the Y-axis which are perpendicular to one another, respectively. This feature makes it possible to drive the exchange head 10 in its entirety in a direction to correct a camera shake, even if the camera main frame 30 swivels by the camera shake, and thereby maintaining the optical axis of the exchange head 10 constant so as to be independent of the camera shake.

Figure 7:
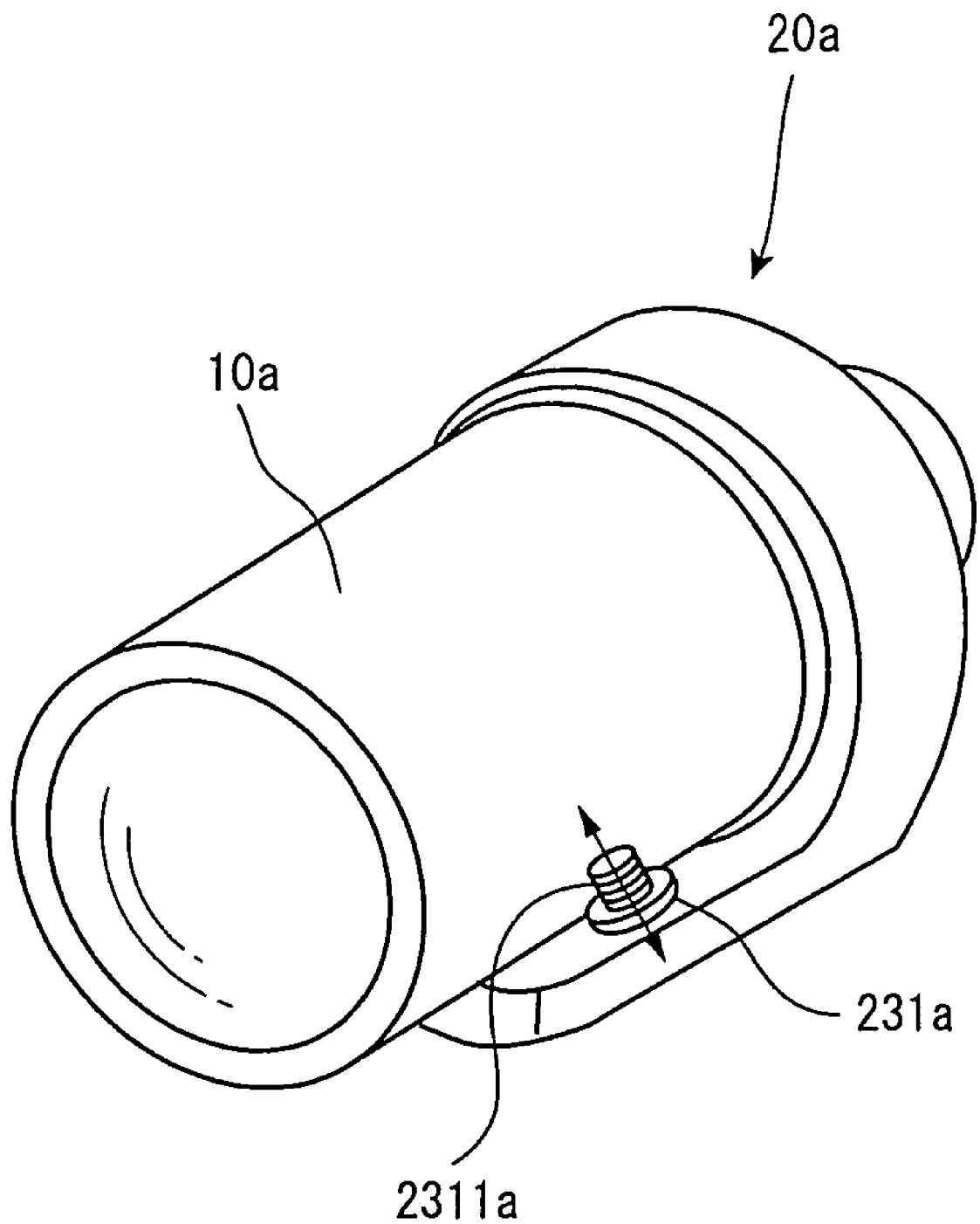
FIG. 7 is a view of an intermediate adapter according to another embodiment of the present invention.

While it is acceptable that there are provided axes, which are perpendicular to one anther as shown in FIG. 4 to FIG. 6, it is acceptable that there are provided axes, which are perpendicular to one anther as shown in FIG. 6 to FIG. 7.

Figure 8:
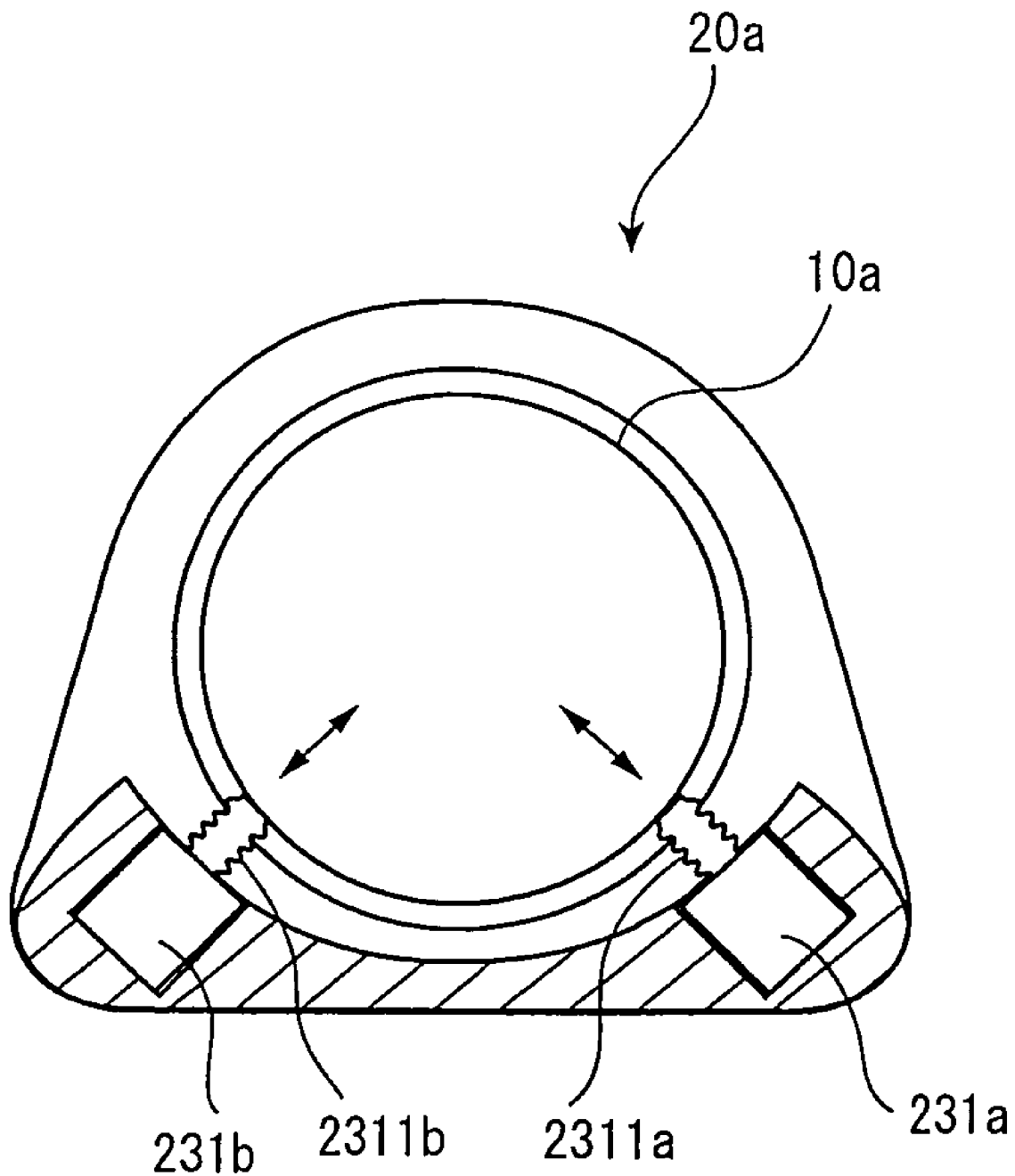
FIG. 8 is a front view of the intermediate adapter shown in FIG. 6.

FIG. 7 is a view of an intermediate adapter according to another embodiment of the present invention. FIG. 8 is a front view of the intermediate adapter shown in FIG. 6.

The intermediate adapter according to another embodiment of the present invention, as shown in FIG. 7 and FIG. 8, also makes it possible to perform the same correct as that of FIG. 3 to FIG. 5.

FIG. 7 and FIG. 8 further disclose an example in which the arrangement position of the head driving section shown in FIG. 4 to FIG. 6 is shifted by 45 degrees, and as actuators for driving lead screws 2311a and 2311b, instead of the motor shown in FIG. 3 to FIG. 5, rotary solenoids 231a and 231b are used. The rotary solenoids 231a and 231b are used to move the lead screws 2311a and 2311b forward and backward so as to push and draw an exchange head 10a with the leading edges of the screws 2311a and 2311b, so that an arrangement for driving the exchange head 10a is simplified. This arrangement makes it possible to more simplify an arrangement of the head driving section as compared with the arrangement in which the motor is used to drive the lead screws, as shown in FIG. 4 to FIG. 6. Incidentally, as shown in FIG. 7 and FIG. 8, when the driving axis is inclined by 45 degree, there is a need to incline by 45 degree detection axes of the horizontal detection section and the vertical detection section of the camera shake detection section 22. It is easy, however, that the horizontal detection section and the vertical detection section are arranged so as to be inclined by 45 degree in the intermediate adapter.

Further, according to the present embodiment, as the actuator, there are used the rotary solenoids 231a and 231b.

It is acceptable, however, that as the actuator, piezoelectric devices or a voice coil motor (VCM) are used instead of the rotary solenoids. In any cases, it is possible to obtain the suitable effects. In those elements, if there is a difference in a response time, the use of the element, which is most excellent in responsibility, makes it possible to promptly drive the exchange head in response to an occurrence of the camera shake and thereby correcting the camera shake with greater accuracy.

Figure 9:
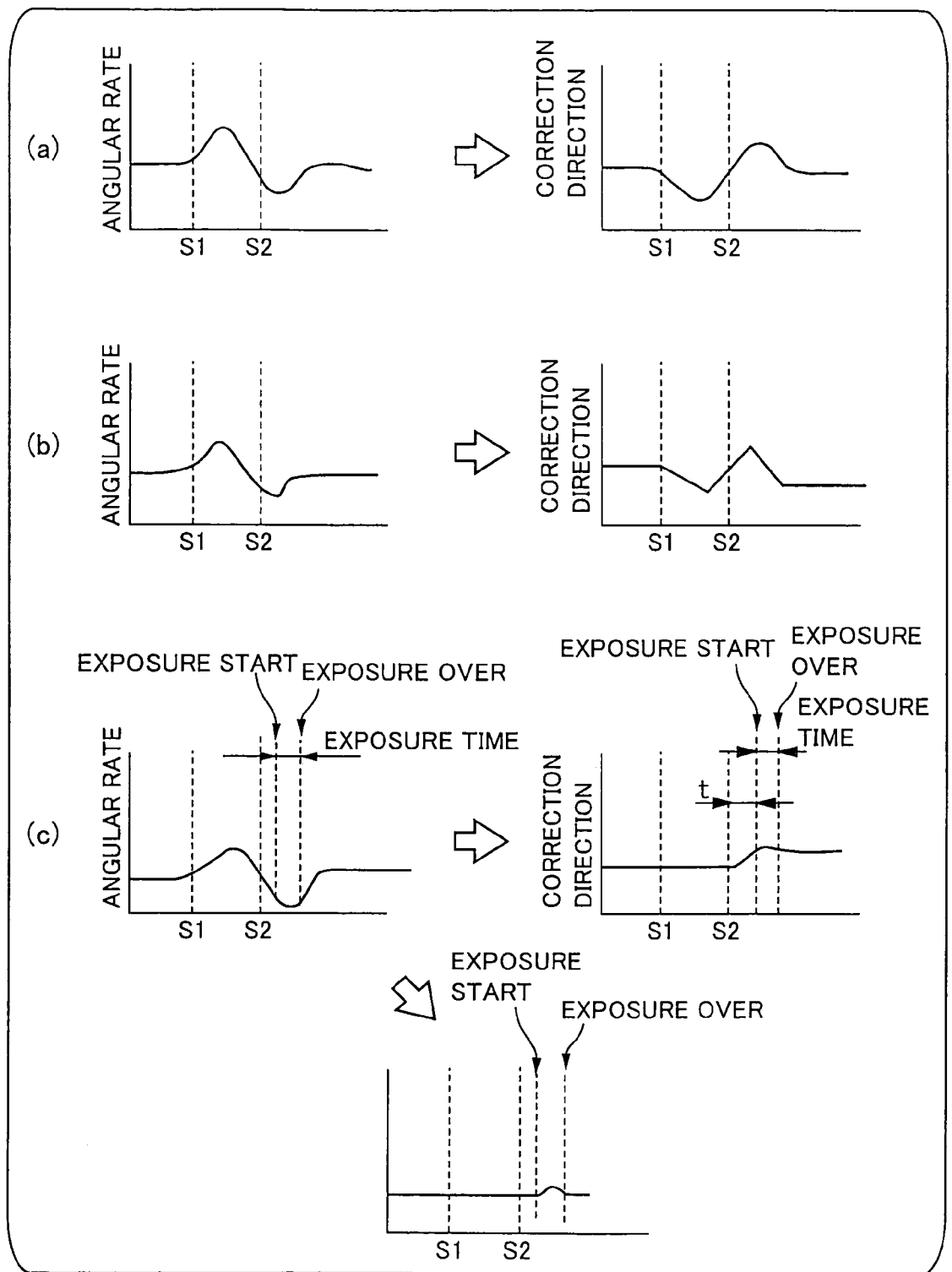
FIG. 9 is an explanatory view useful for understanding how the correction is performed.

FIG. 9 is an explanatory view useful for understanding how the correction is performed.

A lateral axis of the graphs shown in the left side of FIG. 9 denotes a time, and a longitudinal axis denotes a waveform of a detection signal detected by the camera shake detection section (here an angular velocity sensor). A lateral axis of the graphs shown in the right side of FIG. 9 denotes a time, and a longitudinal axis denotes a correction direction. According to the present embodiment, assuming that the release button of the camera main frame 30 has two operating modes, marks S1 and S2, which are shown on the longitudinal axis, denote a timing of a half depression and a full depression, respectively.

As shown in graphs of the left side of a part (a) of FIG. 9 to a part (c) of FIG. 9, camera shake detection signals are detected in form of a variation of angular velocity in accordance with a lapse of time (S1, S2). At the right side of the part (a) of FIG. 9, there is shown a waveform of a correction signal that an addition of the camera shake detection signal shown in the left side of the part (a) thereto forms a constant value. The arithmetic circuit of the CPU 21 of the intermediate adapter 20 readily creates the correction signal. According to the present embodiment, as mentioned above, the circuit is simplified in such an arrangement that the correction signal created in the CPU 21 is directly supplied to the rotary solenoids 231a and 231b (piezoelectric devices or the voice coil motor (VCM) are also acceptable).

In this manner, the simple circuit structure is used to create a camera shake detection signal, and when the camera shake detection signal is applied to the rotary solenoid, the rotary solenoid promptly drives the exchange head 10 in a direction that the rotary solenoid corrects the camera shake.

If the exchange head 10 is compact and light and is excellent in responsibility when it is pushed by the lead screw and the like, it is possible to correct the camera shake with great accuracy through applying to the exchange head 10 the wave as shown at the right side of the part (a) of FIG. 9 to drive the exchange head 10. However, in the event that the exchange head 10 is not light, it may happen that the exchange head 10 is not smoothly driven and there would occur a delay in response. In such a case, as shown at the right side of the part (b) of FIG. 9, when the wave to be applied is straight, the responsibility is improved at the rising portion so that the delay in response can be cancelled and whereby the exchange head 10 is promptly driven. In this manner, the use of the straight wave is easily implemented in such a way that the CPU performs a line approximation, and brings about an effect that the operation time is reduced, so that there is performed the camera shake correction, which is excellent in responsibility and is of great accuracy.

As shown at the left side of the part (c) of FIG. 9, in view of the matter that the exposure is initiated after the full depression (S2), as shown in the part (c) of FIG. 9, it is acceptable that the camera shake correction is carried out after the full depression. This feature makes it possible to reduce a time for driving rotary solenoids and piezoelectric devices and thereby reducing the electric power consumption. Further, as shown below the part (c) of FIG. 9, the exchange head is driven during a period of time from the exposure start after the lapse of a predetermined time to an exposure over without being driven immediately after the full depression. This feature makes it possible to further reduce a time for driving rotary solenoids and piezoelectric devices and thereby further reducing the electric power consumption.

As mentioned above, according to the present embodiment, it is possible to implement an intermediate adapter having the camera shake correction function, which is usable in a camera system in which an exchange head having an image taking optical system and an imaging device is mounted on a camera main frame. Further, it is possible to implement a camera system having the intermediate adapter as a camera shake correction unit.

According to the present embodiment, in the event that the exchange head is of a relatively small type, the use of a holding adapter permits the exchange head to be mounted on the intermediate adapter.

Figure 10:
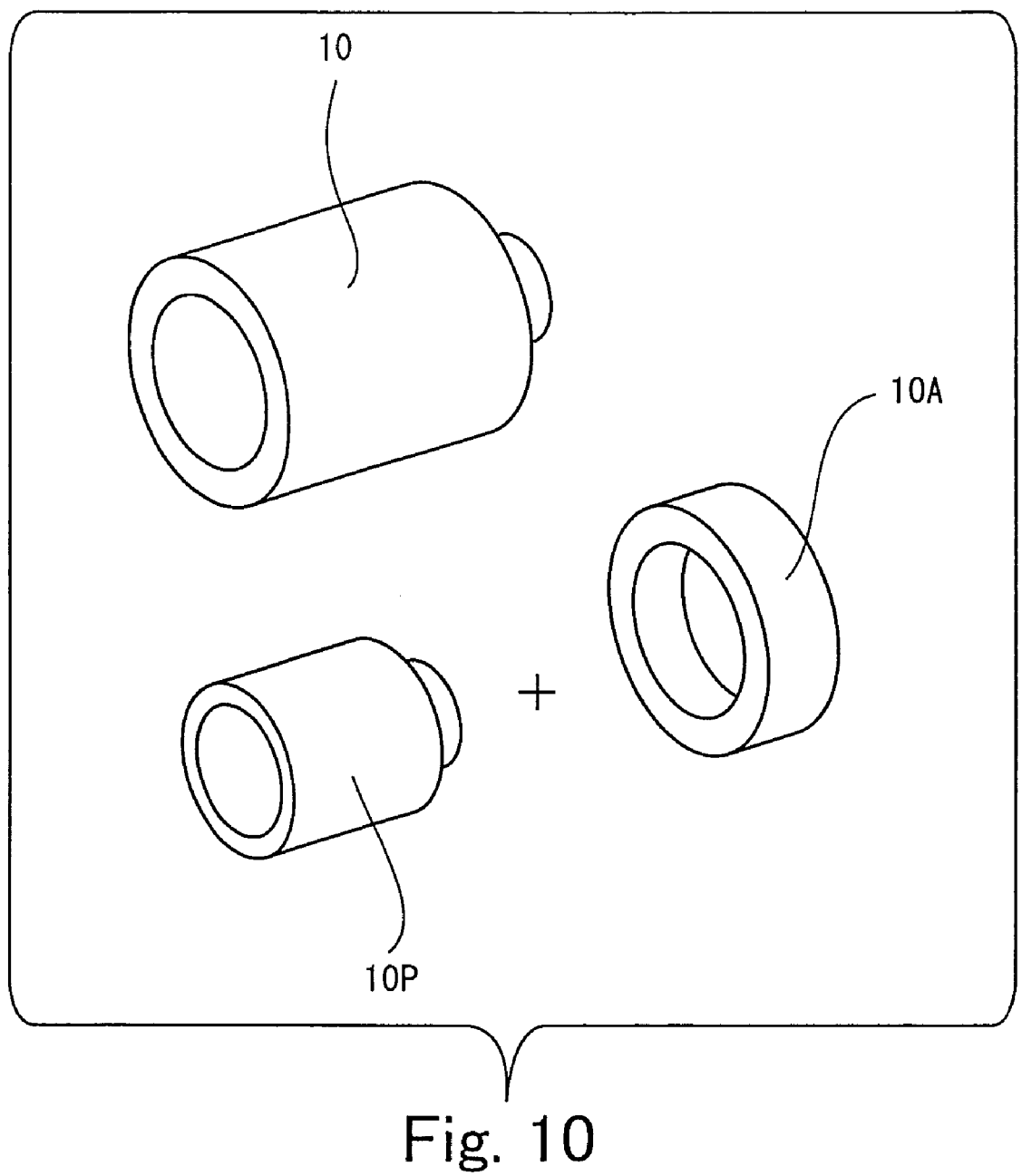
FIG. 10 is a view useful for understanding a holding adapter.

FIG. 10 is a view useful for understanding the holding adapter.

As shown in FIG. 10, in case of the exchange head 10 that is capable of being mounted on the intermediate adapter 20, it is directly mounted on the intermediate adapter. On the other hand, in case of a small type of exchange head 10p as shown below FIG. 10, mounting a holding adapter 10A on the rear end portion of the exchange head 10p makes it possible to mount the exchange head 10p on the intermediate adapter 20. This feature makes it possible to drive the exchange head 10p together with the holding adapter 10A and thereby performing the suitable camera shake correction.

While the above description is concerned with the structure of the intermediate adapter, in some cases, such as size and weight of the exchange head being different, and lens specification of the exchange head being different, it happens that the intermediate adapter cannot perform the camera shake correction.

For some operator, there is a possibility that an exchange head, which cannot be driven by the above-mentioned intermediate adapter, is erroneously mounted on the intermediate adapter. In this case, there is possibility that the exchange head is dropped or the intermediate adapter is destroyed. Even if the exchange head is not dropped or the intermediate adapter is not destroyed, the exchange head is not driven with great accuracy in a direction that the camera shake is corrected. Thus, the photograph would be affected by the camera shake.

In view of the foregoing, according to the present embodiment, the exchange head is provided with camera shake correction permission/prohibition information indicative of permission or prohibition of camera shake correction, and the intermediate adapter is provided with a correction permission/prohibition receiving section for receiving the camera shake correction permission/prohibition information from the exchange head mounted on the intermediate adapter, and whereby it is possible to cope with the above-mentioned erroneous attachment. This feature makes it possible to permit the head driving section to drive the exchange head only when the camera shake correction permission/prohibition information, which is received by the correction permission/prohibition receiving section, is indicative of correction permission.

Figure 11:
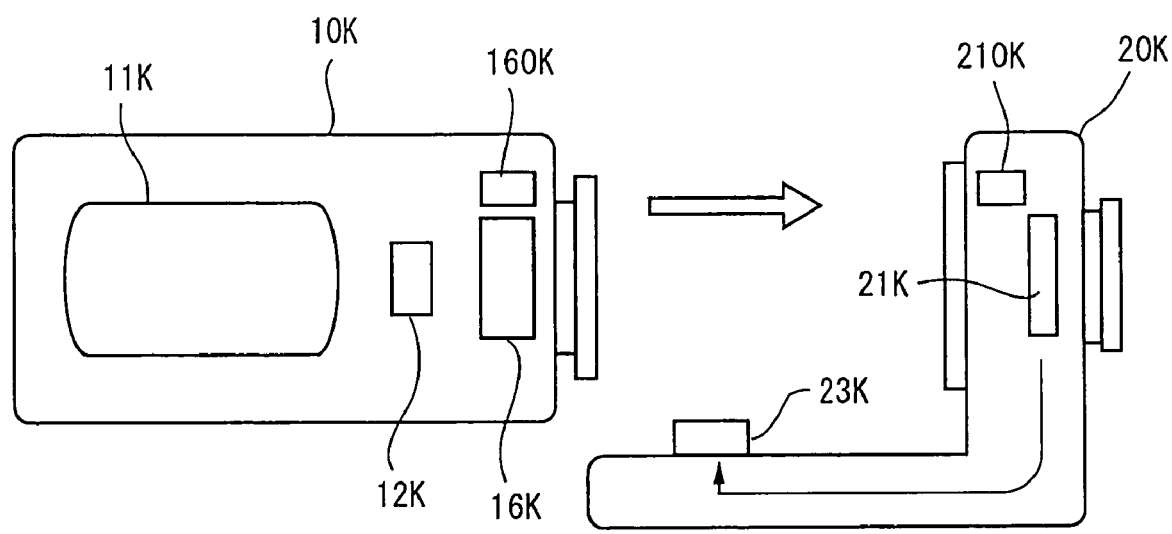
FIG. 11 is a view useful for understanding a flow of data where categorization information is transmitted.

FIG. 11 is a view useful for understanding a flow of data where categorization information is transmitted.

As shown in FIG. 11, the camera shake correction permission/prohibition information, which is stored in a CPU 16K of an exchange head 10K, is transmitted for example via a transmission section 160K (for example, a radio tag) at the exchange head side to an intermediate adapter 20K, and a correction permission/prohibition receiving section 210K (for example, a radio tag receiving section), which is included in the intermediate adapter 20K, receives camera shake correction permission/prohibition information so as to be interpreted by a CPU 21$k$ of the intermediate adapter 20K, and the interpreted information is communicated to a head driving section 23K. For example, in the event that the camera shake correction permission/prohibition information, which is interpreted by a CPU 21$k$ of the intermediate adapter 20K, is prohibition information, the CPU 21$k$ informs the head driving section 23K of the prohibition information, so that the head driving section 23K prohibits driving of the exchange head 10K.

In this manner, when the exchange head 10K is mounted on the camera main frame 30 together with the intermediate adapter 20K to perform the camera shake correction, the intermediate adapter 20K has a function of a decision as to whether the exchange head 10K can be driven. This feature makes it possible, when the exchange head 10, which is impossible in driving for performing the camera shaking, is erroneously mounted on the intermediate adapter 20K, the exchange head 10 is prohibited from being driven.

In some lens specification (for example, aperture values and focal length) of the exchange head 10K, it happens that an driving amount by the head driving section 23K is varied, and in some case, the head driving section cannot drive the exchange head 10K. As mentioned above, in view of the fact that the camera shake correction permission/prohibition information is transmitted from the exchange head 10K, for example, a transmission of the lens specification of the exchange head 10K from the exchange head 10K makes it possible that the intermediate adapter 20K performs the correction to meet the lens specification.

Figure 12:
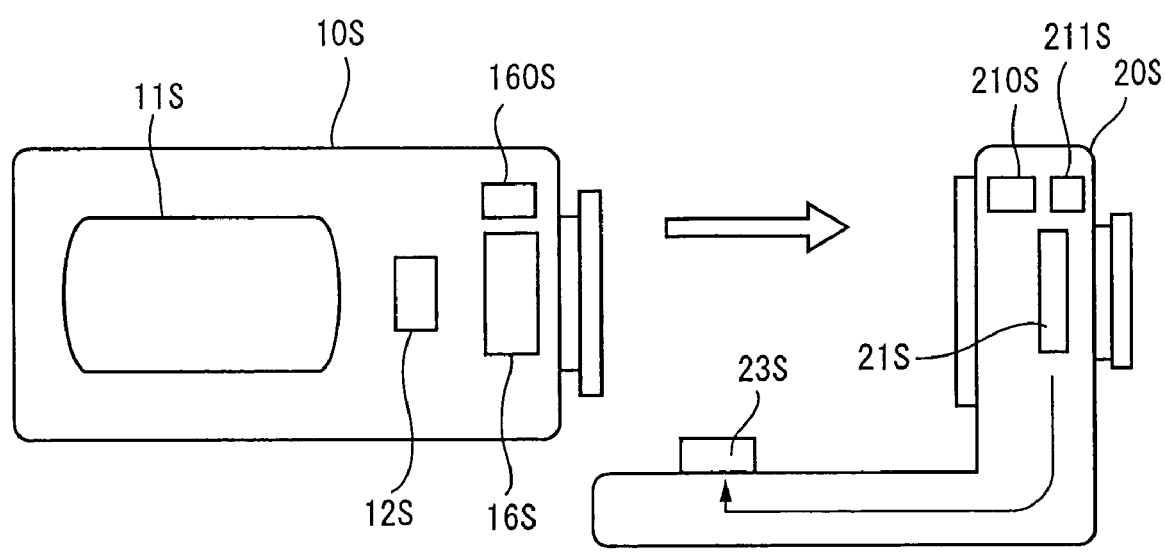
FIG. 12 is a view useful for understanding a flow of information where categorization information of an exchange head including the lens specification is transmitted from the exchange head.

FIG. 12 is a view useful for understanding a flow of information where categorization information of an exchange head including the lens specification is transmitted from the exchange head.

Categorization information indicative of categorization of an exchange head 10S, for example, the lens specification, is stored in a storage section of a CPU 16S of the exchange head 10S. When the exchange head 10S is mounted on an intermediate adapter 20S, some category information stored in the storage section is transmitted via a transmission section 160S to the intermediate adapter 20S. The intermediate adapter 20S is provided with a categorization information receiving section 210S for receiving categorization information transmitted from the exchange head 10S. At the side of a CPU 21S of the intermediate adapter 20S, there is disposed a look up table 211S storing an association between the categorization information and the camera shake correction permission/prohibition information.

When the CPU 21S refers to the look up table 211S, the CPU 21S informs a head driving section 23S of permission information only when the categorization information is associated with the correction permission in the association in the look up table 211S, so that the head driving section 23S drives the exchange head 10S. According to the present embodiment, data, in which the categorization information transmitted from the exchange head 10S is associated with the camera shake correction permission/prohibition information, is stored in the look up table 211S in the CPU 16S, and when the categorization information is transmitted from the exchange head 10S, the look up table 211S is referred to in accordance with the categorization information, so that the CPU 21S in the intermediate adapter 20S decides the correction permission/prohibition in accordance with the reference result, and the operating section of the CPU 21S computes the driving amount according to the categorization information. This feature makes it possible to adapt to various lens specification types of exchange heads.

Thus, driving of the exchange head by the head driving section of the intermediate adapter makes it possible to surely correct the camera shake. On the other hand, in the event that an exchange head, which is not suitable for driving by the head driving section of the intermediate adapter, is mounted, the exchange head is not driven by the head driving section, so that photography is carried out without correction of camera shake.

Figure 13:
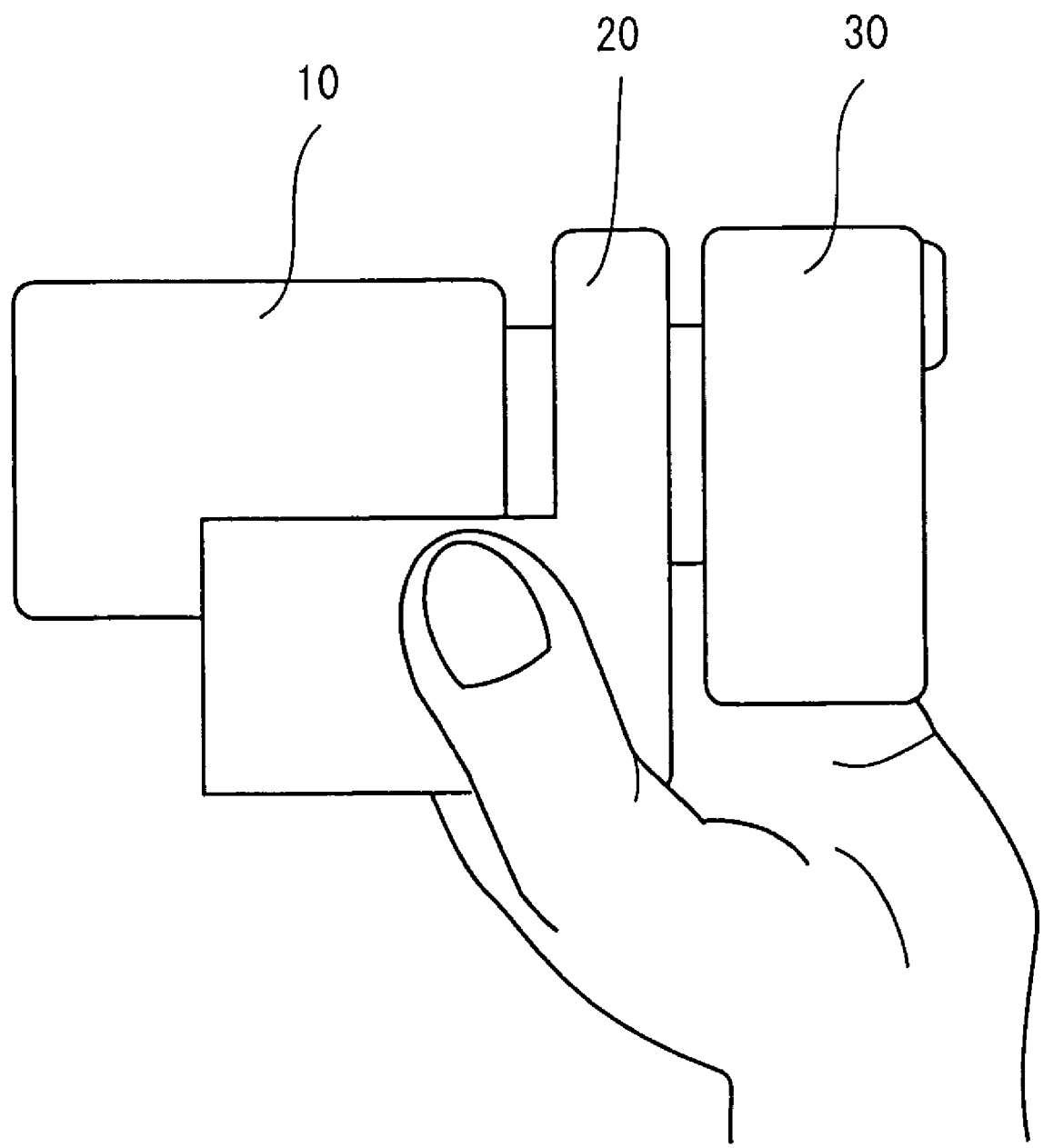
FIG. 13 is an explanatory view useful for understanding how the camera system, which is capable of correcting the camera shake by using an intermediate adapter, is to be held.

FIG. 13 is an explanatory view useful for understanding how the camera system, which is capable of correcting the camera shake by using an intermediate adapter, is to be held.

In the event that photography is carried out using a camera system in which the exchange head 10 is mounted on the intermediate adapter 20 and the intermediate adapter 20 is mounted on the camera main frame 30, as shown in FIG. 13, photography is carried out through holding by hand the under portion of the intermediate adapter 20, so that the exchange head 10 is free from no movement, and surely correcting the camera shake by the intermediate adapter 20.

However, in the event that an operator holds the exchange head itself, a driving torque of the head driving section is inferior to the operator's holding force, so that the exchange head is not driven by the head driving section, and whereby the camera shake correction is not performed. In view of the foregoing, there is provided a palm guard section instead of a protector so that the operator is prohibited from holding the exchange head directly.

Hereinafter, there will be explained the palm guard.

Figure 14:
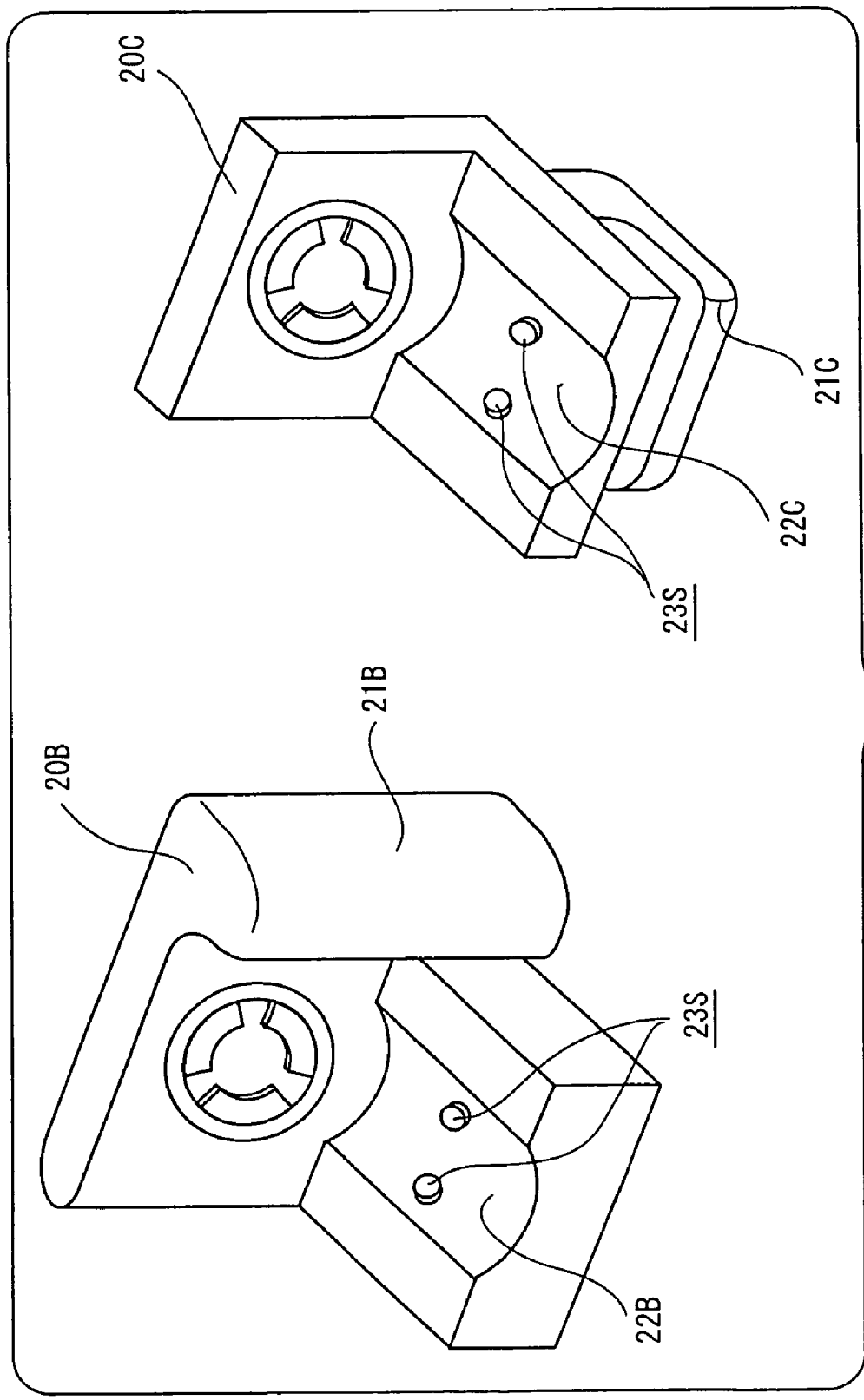
FIG. 14 is an illustration showing an example in which palm guard sections 21B and 21C are provided on intermediate adapters 20B and 20C, respectively.

FIG. 14 is an illustration showing an example in which palm guard sections 21B and 21C are provided on intermediate adapters 20B and 20C, respectively.

In order that the operator is prohibited from holding the exchange head directly, it is preferable that the palm guard sections 21B and 21C are provided on at least lower portion of the exchange head, and are at least to cover the rear portion of the exchange head mounted on the intermediate adapters, and further it is preferable that the palm guard sections 21B and 21C have configuration or geometry to cover the rear portion of the exchange head in its entirety or the under portion of the rear portion.

FIG. 14 shows an example in which the palm guard section 21C is provided at the lower portion of an intermediate adapter 20C having a recess 22C onto which the exchange head as shown in FIG. 3 is mounted, and another example in which the palm guard section 21B is provided at the rear side portion of an intermediate adapter 20B in form of a grip.

In any cases, holding of the palm guard section is free from holding of the exchange head, so that the head driving section of the intermediate adapter makes it possible to drive the exchange head and thereby surely correcting the camera shake.

As mentioned above, according to the present invention, it is possible to implement an intermediate adapter having a camera shake correction function, in which an exchange head provided with an image taking optical system and an imaging device is applicable to a camera system, and a camera system having the intermediate adapter.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An intermediate adapter comprising:
   a camera shake detection section that detects camera shake;
   a head driving section that drives an exchange head in a direction that the camera shake is corrected in accordance with a detection result of the camera shake detection section; and
   wherein the intermediate adapter is interposed between the exchange head for generating an image signal through catching a subject image by an image taking optical system and a camera main frame on which the exchange head is detachably mounted to receive the image signal and perform at least one of an image display and an image storage, the intermediate adapter being attachable to the camera main frame, and the exchange head being attachable to the intermediate adapter.

2. An intermediate adapter according to claim 1, wherein the exchange head or the camera main frame has a sensor that detects the camera shake instead of the camera shake detection section, and the intermediate adapter comprises a camera shake receiving section that receives a camera shake detection signal.

3. An intermediate adapter according to claim 2, wherein the exchange head has correction permission/prohibition information indicative of permission or prohibition of camera shake correction,
   the intermediate adapter has a correction permission/prohibition receiving section that receiving the correction permission/prohibition information from the exchange head that is mounted on the intermediate adapter, and
   the head driving section drives the exchange head only when the correction permission/prohibition information received by the correction permission/prohibition receiving section is indicative of a correction permission.

4. An intermediate adapter according to claim 2, wherein the exchange head has categorization information indicative of categorization of the exchange head,
   the intermediate adapter comprises a categorization information receiving section that receives the categorization information from the exchange head that is mounted on the intermediate adapter, and an association storage section that stores an association between the categorization information and the correction permission/prohibition information indicative of permission or prohibition of camera shake correction, and
   the head driving section drives the exchange head only when the categorization information received by the categorization information receiving section is associated with a correction permission in the association between the categorization information and the correction permission/prohibition information.

5. An intermediate adapter according to claim 1, wherein the exchange head has correction permission/prohibition information indicative of permission or prohibition of camera shake correction,
   the intermediate adapter has a correction permission/prohibition receiving section that receiving the correction permission/prohibition information from the exchange head that is mounted on the intermediate adapter, and
   the head driving section drives the exchange head only when the correction permission/prohibition information received by the correction permission/prohibition receiving section is indicative of a correction permission.

6. An intermediate adapter according to claim 1, wherein the exchange head has categorization information indicative of categorization of the exchange head,
   the intermediate adapter comprises a categorization information receiving section that receives the categorization information from the exchange head that is mounted on the intermediate adapter, and an association storage section that stores an association between the categorization information and the correction permission/prohibition information indicative of permission or prohibition of camera shake correction, and
   the head driving section drives the exchange head only when the categorization information received by the categorization information receiving section is associated with a correction permission in the association between the categorization information and the correction permission/prohibition information.

7. An intermediate adapter according to claim 1, wherein the exchange head is held via a holding adapter for holding the exchange head on the intermediate adapter in accordance with categorization of the exchange head.

8. An intermediate adapter according to claim 1, wherein the intermediate adapter has a palm guard section provided on at least lower portion of the exchange head, and being at least to cover a rear portion of the exchange head mounted on the intermediate adapter.

9. An intermediate adapter according to claim 1, wherein the palm guard section has a geometry to cover the rear portion of the exchange head in its entirety or an under portion of the rear portion.

10. A camera system comprising:
    an exchange head for generating an image signal through catching a subject image by an image taking optical system;
    a camera main frame on which the exchange head is detachably mounted to receive the image signal and perform at least one of an image display and an image storage;
    an intermediate adapter that is interposed between the exchange head and the camera main frame, the intermediate adapter being attachable to the camera main frame, and the exchange head being attachable to the intermediate adapter, the intermediate adapter comprising:
    a camera shake detection section that detects camera shake; and
    a head driving section that drives the exchange head in a direction that the camera shake is corrected in accordance with a detection result of the camera shake detection section.

11. A camera system according to claim 10, wherein the exchange head or the camera main frame has a sensor that detects the camera shake instead of the camera shake detection section, and the intermediate adapter comprises a camera shake receiving section that receives a camera shake detection signal.

12. A camera system according to claim 11, wherein the exchange head has correction permission/prohibition information indicative of permission or prohibition of camera shake correction,
- the intermediate adapter has a correction permission/prohibition receiving section that receiving the correction permission/prohibition information from the exchange head that is mounted on the intermediate adapter, and
- the head driving section drives the exchange head only when the correction permission/prohibition information received by the correction permission/prohibition receiving section is indicative of a correction permission.

13. A camera system according to claim 11, wherein the exchange head has categorization information indicative of categorization of the exchange head,
- the intermediate adapter comprises a categorization information receiving section that receives the categorization information from the exchange head that is mounted on the intermediate adapter, and an association storage section that stores an association between the categorization information and the correction permission/prohibition information indicative of permission or prohibition of camera shake correction, and
- the head driving section drives the exchange head only when the categorization information received by the categorization information receiving section is associated with a correction permission in the association between the categorization information and the correction permission/prohibition information.

14. A camera system according to claim 10, wherein the exchange head has correction permission/prohibition information indicative of permission or prohibition of camera shake correction,
- the intermediate adapter has a correction permission/prohibition receiving section that receiving the correction permission/prohibition information from the exchange head that is mounted on the intermediate adapter, and
- the head driving section drives the exchange head only when the correction permission/prohibition information received by the correction permission/prohibition receiving section is indicative of a correction permission.

15. A camera system according to claim 10, wherein the exchange head has categorization information indicative of categorization of the exchange head,
- the intermediate adapter comprises a categorization information receiving section that receives the categorization information from the exchange head that is mounted on the intermediate adapter, and an association storage section that stores an association between the categorization information and the correction permission/prohibition information indicative of permission or prohibition of camera shake correction, and
- the head driving section drives the exchange head only when the categorization information received by the categorization information receiving section is associated with a correction permission in the association between the categorization information and the correction permission/prohibition information.

16. A camera system according to claim 15, wherein the palm guard section has a geometry to cover the rear portion of the exchange head in its entirety or an under portion of the rear portion.

17. A camera system according to claim 10, wherein the camera system further comprises a holding adapter for holding the exchange head on the intermediate adapter in accordance with categorization of the exchange head, and wherein the exchange head is held via the holding adapter.

18. A camera system according to claim 10, wherein the intermediate adapter has a palm guard section provided on at least lower portion of the exchange head, and being at least to cover a rear portion of the exchange head mounted on the intermediate adapter.

* * * * *